(12) United States Patent
Scanlan et al.

(10) Patent No.: US 10,995,597 B1
(45) Date of Patent: May 4, 2021

(54) METHODS AND MATERIALS FOR HYDRAULIC FRACTURING

(71) Applicant: NEXTIER COMPLETION SOLUTIONS INC., Houston, TX (US)

(72) Inventors: William Scanlan, Denver, CO (US);
Deanna Dapolito, Denver, CO (US);
Kyle Pierskalla, Denver, CO (US)

(73) Assignee: NexTier Completion Solutions Inc., Houston, TX (US)

( * ) Notice: Subject to any disclaimer, the term of this patent is extended or adjusted under 35 U.S.C. 154(b) by 142 days.

(21) Appl. No.: 16/358,539

(22) Filed: Mar. 19, 2019

Related U.S. Application Data

(62) Division of application No. 15/675,386, filed on Aug. 11, 2017, now Pat. No. 10,240,449.

(60) Provisional application No. 62/373,676, filed on Aug. 11, 2016.

(51) Int. Cl.
| | |
|---|---|
| *E21B 43/267* | (2006.01) |
| *E21B 33/138* | (2006.01) |
| *C09K 8/80* | (2006.01) |
| *E21B 21/00* | (2006.01) |

(52) U.S. Cl.
CPC ........... *E21B 43/267* (2013.01); *C09K 8/805* (2013.01); *E21B 33/138* (2013.01); *C09K 2208/10* (2013.01); *E21B 21/00* (2013.01)

(58) Field of Classification Search
CPC ...... E21B 43/267; E21B 33/138; E21B 21/00; C09K 8/805; C09K 2208/10
See application file for complete search history.

(56) References Cited

U.S. PATENT DOCUMENTS

| | | | |
|---|---|---|---|
| 4,387,769 | A | 6/1983 | Erbstoesser et al. |
| 8,281,860 | B2 | 10/2012 | Boney et al. |
| 2006/0048943 | A1 | 3/2006 | Parker et al. |
| 2009/0044945 | A1 | 2/2009 | Willberg |
| 2011/0083849 | A1 | 4/2011 | Medvedev |
| 2012/0285692 | A1 | 11/2012 | Potapenko et al. |
| 2015/0041132 | A1 | 2/2015 | Nelson et al. |
| 2015/0223326 | A1 | 8/2015 | Lim et al. |

FOREIGN PATENT DOCUMENTS

| | | |
|---|---|---|
| WO | 2008026076 A2 | 3/2008 |
| WO | 2009088317 A1 | 7/2009 |

OTHER PUBLICATIONS

FracTech Laboratories, Baseline Fracture Conductivity and Permeability, IS14060—Propynite 20, Ceramic Proppant, Mar. 3, 2014, 10 ppages.

(Continued)

*Primary Examiner* — Frances Tischler
(74) *Attorney, Agent, or Firm* — Avant Law Group, LLC

(57) ABSTRACT

Compositions and methods are provided for plugging a fracture network in a wellbore. Exemplary compositions comprise a mixture of particles, some of the particles being degradable and other particles being elongated, having good compressive strength, and not being readily degradable at the conditions of the formation. The mixture of particles can temporarily bridge or plug fractures within the formation, and thus acts as a temporary diversion agent. After the degradable particles dissolve, the particles which are not readily degradable can remain in the fracture, helping to keep the fracture open and acting as a proppant.

18 Claims, 3 Drawing Sheets

(56) References Cited

OTHER PUBLICATIONS

Gandossi et al., An Overview of Hydraulic Fracturing and Other Formation Stimulation Technologies for Shale Gas Production, European Commission, JRC Science for Policy Report, 2015, 8 pages.

Schlumberger, RodPROP, High-Aspect-Ratio Proppant, www.slb.com/stimulation, 2013, 2 pages.

METHODS AND MATERIALS FOR HYDRAULIC FRACTURING

CROSS-REFERENCE TO RELATED APPLICATIONS

This application is a divisional application of U.S. patent application Ser. No. 15/675,386, filed Aug. 11, 2017, which claims priority to U.S. Provisional Patent Application No. 62/373,676, filed Aug. 11, 2016. These applications are each incorporated by reference herein in their entireties.

BACKGROUND

Treatment procedures are used in oil and gas production for a variety of purposes. For example, hydraulic fracturing is a form of stimulation treatment used to create conductive flow paths between the reservoir and the wellbore. Treatments which involve introducing a treatment fluid into the wellbore may be adversely affected by loss of the treatment fluid into highly permeable regions of the formation.

Several agents to prevent treatment fluid loss and/or divert treatment fluid have been developed. For example, U.S. Pat. No. 4,387,769 describes fluid loss control agents comprising a polyester polymer which is substantially insoluble in the wellbore fluid, but which degrades in the presence of water at an elevated temperature to oligomer which are at least partially soluble in a fluid present in the formation (e.g. oil and/or connate water dissolved in the subterranean hydrocarbon fluids). Polymers selected from the group of poly(D, L-lactide), cross-linked poly(D,L-lactide), and copolymers of glycolide and D,L-lactide are described as preferred.

U.S. Patent Application Publication US 2012/0285692 describes methods of treating a subterranean formation penetrated by a well bore by providing a treatment fluid comprising a blend including a first amount of particulates having a first average particle size between about 3 mm and 2 cm and a second amount of particulates having a second average size between about 1.6 and 20 times smaller than the first average particle size or a second amount of flakes having a second average size up to 10 times smaller than the first average particle size. The publication states that the particles(s) or flake(s) can be embodied as proppant.

U.S. Patent Application Publication US 2015/0041132 describes diversion of well treatment fluids from a high permeability zone to a low permeability zone within a fracture network by use of a mixture comprising a dissolvable diverter and a proppant.

SUMMARY

The following presents a simplified summary of the invention in order to provide a basic understanding of some aspects of the invention. The summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In one embodiment, a composition for use in treatment of a wellbore includes a mixture of about 5 to 20 wt % of a first type of particle, about 5 to 20 wt % of a second type of particle, and about 60 to 90 wt % of a third type of particle. The first type of particle has a particle size from 2 mm to 3.5 mm, and is manufactured of a first degradable material. The second type of particle has a particle size less than or equal to 0.600 mm, and is manufacture of a second degradable material. Finally, the third type of particle is elongated in shape, has a width from about 0.700 mm to 1 mm, a length from about 1.5 to 5 times the width, and is made of a ceramic material.

In another embodiment, a method for the treatment of a wellbore in fractured subterranean formation includes the steps of introducing into the wellbore a treatment fluid and forming a plug to seal at least one fracture in the fractured subterranean formation. The treatment fluid includes about 5 to 20 wt % of a first type of particle, about 5 to 20 wt % of a second type of particle, about 60 to 90 wt % of a third type of particle, and a carrier fluid. The first type of particle has a particle size from 2 mm to 3.5 mm and comprises a first degradable material. The second type of particle has a particle size less than or equal to 0.6 mm and comprises a second degradable material. The third type of particle is elongated in shape, has a width from 0.7 mm to 1.2 mm, a length from 1.5 to 5 times the width, and comprises a ceramic material. The plug comprises particles of the first, second, and third type.

DETAILED DESCRIPTION OF THE INVENTION

Figure 1:
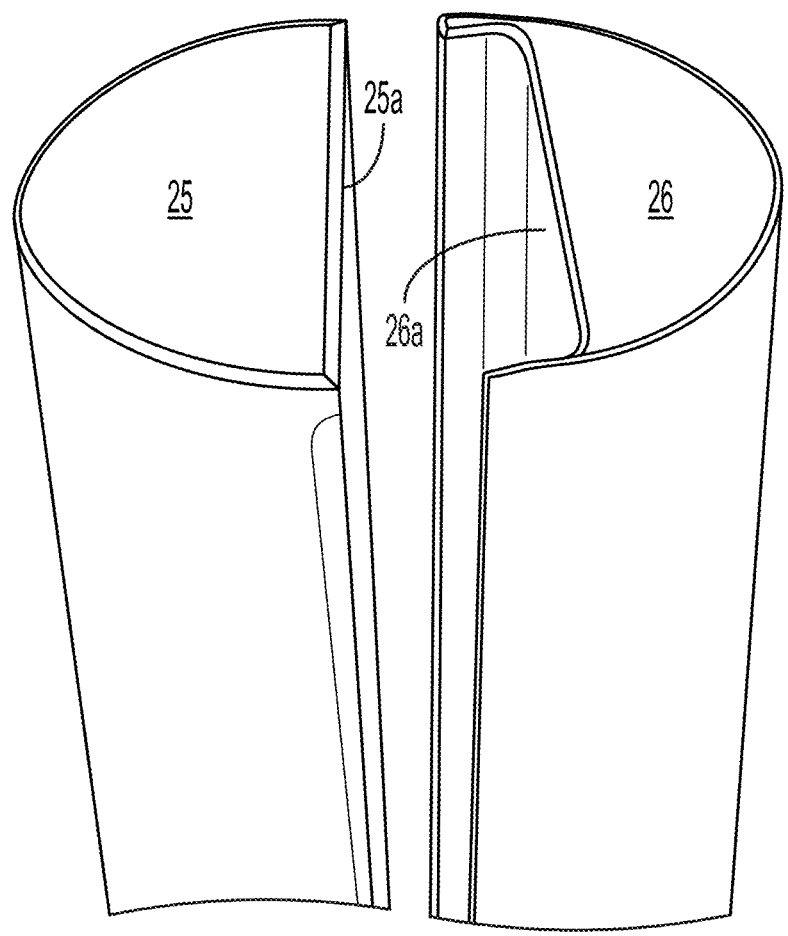
FIG. 1 illustrates two parts (25, 26) which together form a slot for use in a slot testing device. When the two parts are placed in contact, the distance between faces 25a and 26a determines the slot width.

As used herein, a wellbore is a drilled hole or borehole. The rock around the borehole is referred to as the "formation", with the rock face bounding the drilled hole being referred to as the "formation face" or "face of the formation." A wellbore may be referred to as being in the formation, which is typically subterranean, or the formation may be referred to as being penetrated by the well bore. A reservoir is a subsurface body of rock having sufficient porosity and permeability to store and transmit fluids such as oil or gas. The compositions and methods described herein are suitable for use with cased (lined) or open hole wellbores.

In one embodiment, a composition for use in the treatment of a wellbore includes a mixture of particles. Some of the particles may be degradable. Other particles may be elongated and have good crush resistance. The elongated particles may not be readily degradable at the conditions of the formation. The mixture of particles can temporarily bridge or plug fractures within the formation, and thus acts as a temporary diversion agent. The mixture of particles can also assist in sand control of the well. After the degradable particles dissolve, the particles which are not readily degradable can remain in the fracture, helping to keep the fracture open and acting as a proppant. Use of such elongated particles can provide superior fluid conductivity at the face of the fracture.

As used herein, a degradable particle degrades at the conditions of the formation, including at the face of the formation. A degradable particle may degrade within 1 to 7 days or in less than 30 days under relatively low temperature conditions of the reservoir (e.g. without heating). Degradable particles suitable for use with the invention include but are not limited to polymer particles capable of degradation under formation conditions. Examples include polymers obtained by polymerization of hydroxycarboxylic acids and polymers obtained by esterification of hydroxylaminoacids and copolymers thereof. Specific examples of acceptable polymers include but are not limited to: polylactic acid, polyglycolic acid, polyhydroxybutyrate, polyepsilon caprolactone, urea based polymeric material including isobutylidenediurea and urea-formaldehyde, and copolymers thereof. Suitable degradable particles have shapes that are substantially spherical (e.g. beaded), ellipsoidal, flake, or irregular.

In embodiments, the composition includes at least two sizes of degradable particles. It shall be understood that the particle size ranges specified herein may refer to average or median particle size. As an example, the larger size particles may have a size range from about 2 mm to about 3.5 mm. In embodiments, the larger size particles may be greater than about 2.3 mm to less than about 3.4 mm, or greater than about 2 mm to less than about 3 mm. In other examples, the larger size particles may have a size greater than No. 10 mesh and less than No. 6 mesh, or greater than No. 8 mesh and less than No. 6 mesh.

The smaller size particles may have a broader size range, with the upper end of the size range being approximately 5 to 6 times smaller than the larger size particles. For example, the smaller size particles may have a size less than or equal to about 600 μm, less than or equal to about 550 μm, or less than or equal to about 500 μm. In other examples, the smaller size particles have a size less than No. 30 mesh or less than No. 35 mesh. In some embodiments, none of the degradable particles in the mixture are greater than 4 mm in size (No. 5 mesh).

In embodiments, degradable flakes are used alone or in combination with one or more sizes of degradable spherical or ellipsoidal particles and the elongated particles. In one embodiment, degradable flakes are used with at least two different sizes of spherical or ellipsoidal degradable particles and the elongated particles. In one embodiment, the width of the flakes ranges from approximately 0.100 in to approximately 0.5 in. In one aspect, the width ranges from approximately 0.101 to approximately 0.494 in. In another aspect, the average width of the flake is about 0.148 in. The length of the flakes ranges from approximately 0.080 in to approximately 0.220 in. In an aspect, the length ranges from approximately 0.083 to about 0.215 in. In another aspect, the average length of the flakes is about 0.129 in or about 0.134 in. The thickness of the flakes ranges from approximately 0.010 in to approximately 0.025 in. In an aspect, the thickness ranges from approximately 0.018 in to approximately 0.02 in. In another aspect, the average thickness of the flakes is about 0.019 in or about 0.024 in.

Moving on, the size of the elongated particles may be defined by the aspect ratio. The aspect ratio may is the length of the maximum particle divided by the width of the particle. For example, for a particle which is generally cylindrical in shape the aspect ratio is the length of the particle divided by the diameter of the particle. The length and width used to determine the aspect ratio for a given particle may be the maximum length and width. In embodiments, the elongated particles have an aspect ratio greater than 1. According to one embodiment, the width of the elongated particles ranges from about 700 μm to about 1.4 mm or from about 800 μm to about 1.1 mm. In embodiments, at least 75% of the elongated particles have a length from 1 mm to 2.5 mm. In other embodiments, the length of at least 75% of the particles is from 1.0 to 10 times, 1.0 to 5 times, 1.5 to 2.5 times, or from 2 to 3 times the width (or the median width) of the collection of particles.

In some embodiments, the sizing of the particles is defined such that they will pass through a screen with openings of the larger size and be retained by a screen with openings of the smaller size. Other methods for defining the size of particles, such as a mass based average or median particle size are known to those skilled in the art.

As used herein, the bulk volume of a collection of solid particles includes the volume of the particles, any voids within the particles and the voids between the particles. The bulk density, also called the bulk powder density is the mass of the particles divided by the volume they occupy (which includes the voids between the particles and any space that they occupy). The bulk density may be measured as a packed or tamped density. In one embodiment, the tamped bulk density of the elongated particles ranges from about 1.5 g/cm$^3$ (approximately 93 lb/ft$^3$) to about 3.0 g/cm$^3$ (approximately 187 lb/ft$^3$). In one embodiment, the bulk density of the degradable particles is from about 0.19 g/cm$^3$ (approximately 12 lb/ft$^3$) to about 0.80 g/cm$^3$ (approximately 50 lb/ft$^3$). In another embodiment, the bulk density of the composite blend ranges from about 2.5 g/cm$^3$ (approximately 156 lb/ft$^3$) to about 2.8 g/cm$^3$ (approximately 175 lb/ft$^3$).

Elongated particles suitable for use with the invention include, but are not limited to materials with high crush resistance and compressive strength. As an example, the crush resistance as measured with API crush resistance procedures (e.g. API RP 56 or 19C) is such that less than 20 wt % of the particles are crushed at 15,000 psi. In embodiments, the elongated particles comprise a ceramic material. Ceramic materials are inorganic, non-metallic materials, which are typically crystalline. Typical ceramic compounds are formed between metallic and non-metallic elements, such as metal oxides, metal nitrides and metal carbides. Aluminum oxide is one example of a metal oxide. Bauxite is a rock including hydrous aluminum oxides and aluminum hydroxides and typically also including silicon oxide, iron oxides, and titanium oxide. Sintered bauxite, kaolin, magnesium silicate, corundum, and bauxite-kaolin blend proppants are known to the art. For typical alumina containing ceramics used as proppants, the alumina content influences the density, with increasing alumina content being associated with higher density. In an embodiment, the ceramic material comprises alumina (aluminum oxide $Al_2O_3$), corundum, or sintered bauxite. For example, the amount of alumina may be from 40 wt % to 80 wt %, at least 70 wt %, at least 80 wt %, or from 80 wt % to 95 wt %.

In embodiments, the mixture is characterized by the relative weight percentages of the components. In one example, the weight percentage of the degradable particles is from about 10 wt % to about 40 wt % and the weight percentage of the elongated particles is from about 60 wt % to about 90 wt %. In some embodiments, the weight percentage of the larger size degradable particles is from about 5 to 20 wt % and the weight percentage of the smaller size degradable particles is also from about 5 to 20 wt %. The the specific gravity of the degradable particles may be from about 0.7 to 1.7 g/cm$^3$ (g/cc), about 1.0 to 1.7 g/cm$^3$, or 1.2 to 1.5 g/cm$^3$. The specific gravity of the elongated particles may be from about 2.4 to 3.98 g/cm³, from about 2.5 to 2.8 g/cm³, or from about 3.4 to 3.7 g/cm³. In embodiments, the mixture comprises up to 5 wt % or up to 2 wt % additives. Such additives include, but are not limited to a scale inhibitor, breaker and/or a clay stabilizer.

In additional embodiments, the composition is characterized by the relative volume percentages of the components. As an example, the volume percentage of the elongated particles is from about 50% to 70% and the volume of the degradable particles is from about 30% to 50%, as measured from bulk volumes of particles that are mixed together to form the composition. In some embodiments, the volume percentage of the larger size degradable particles is from about 15 to 25% and the volume percentage of the smaller size degradable particles is also from about 15 to 25%, as measured from the bulk volumes of the particles.

In one embodiment a composition is provided for treatment of a wellbore, the composition includes a mixture of 5 to 20 wt % of a first type of particle; 5 to 20 wt % of a second type of particle; and 60 to 90 wt % of a third type of particle. The first type of particle has a particle size from 2 mm to 3.5 mm and includes a first degradable material. The second type of particle has an particle size less than or equal to 0.6 mm and includes a second degradable material. Finally, the third type of particle is elongated in shape, has a width from 0.7 mm to 1.2 mm and a length from 1.5 to 5 times the width, and includes a ceramic material. In one embodiment, the first and second degradable materials are the same; in another embodiment, the first and second degradable materials are different. In further embodiments, the mixture comprises up to 5 wt % or up to 2 wt % additives.

In one embodiment, a method for making the compositions described herein comprises mixing together about 5 to 20 wt % of a first type of particle, the first type of particle having an particle size from 2 mm to 3.5 mm and comprising a first degradable material; about 5 to 20 wt % of a second type of particle, the second type of particle having an particle size less than or equal to 0.6 mm and comprising a second degradable material; and about 60 to 90 wt % of a third type of particle, the third type of particle being elongated in shape, having an width from 0.7 mm to 1.2 mm, having a length from 1.5 to 5 times the width, and comprising a ceramic material.

In a further embodiment, treatment fluids and methods for treatment of a wellbore are provided. Exemplary methods for treatment of a wellbore include the step of introducing the compositions and treatment fluids described herein into the wellbore. In embodiments, a composition as described herein is sent downhole in a viscous plug that carries the components together to a fracture. In some embodiments, an initial bridge may be formed within the fracture, the initial bridge comprising primarily the larger degradable particles. The elongated particles and smaller degradable particles then fill in around the bridging particles to reduce the fluid conductivity of the bridge and eventually seal off the fracture, thereby force diversion to another weak spot in the rock or set of perforations that will break. In an aspect, suitably sized particles from the composition can enter fractures near the face of the formation until bridging occurs. Typically, particles from the composition will form a filter cake or plug on the face of the formation once bridging has occurred. If this portion of the wellbore is cased, the filter cake or plug will typically form behind the casing.

The methods as described herein can be used to divert existing fracture planes near a well bore in a refracturing situation and/or within a stage on a new fracturing job to ensure that all perforation clusters are effectively stimulated through the use of "intra-stage diversion." Therefore, exemplary wellbore treatments can temporarily produce a reduction in the permeability of at least a portion of the subterranean formation, thereby diverting flow.

In embodiments, a method for treatment of a wellbore in a fractured subterranean formation is provided. The method includes introducing into the wellbore a treatment fluid that includes a suspension of a first type of particle comprising a first degradable material, a second type of particle comprising a second degradable material, and a third type of particle being elongated in shape and comprising a ceramic material in a carrier fluid.

Carrier fluids include, but are not limited to water-based fluids and oil-based fluids. Water based fluids include, but not limited to water, brine, "slickwater" or a linear gel. Typically slickwater includes a friction reducer. Friction reducers are known to the art and include, but are not limited to polyacrylic acid (PAAc), polyacrylamide (PAAm), partially hydrolyzed polyacrylamide (PHPA) and acrylamidomethylpropane sulfonate (AMPS). Exemplary linear gels include uncrosslinked polysaccharide solutions such as guar, derivatized guar, hydroxyethyl cellulose (HEC) and xanthan. Oil-based fluids include, but are not limited to, hydrocarbon oils such as petroleum-based oils (e.g., mineral oil).

In embodiments, the carrier fluid is a water-based fluid. In further embodiments, the water-based carrier fluid is selected from the group consisting of water, salt brine, slickwater (e.g. polyacrylamide slickwater) or a linear gel (e.g. a polysaccharide gel). In further embodiments, the treatment fluid further comprises a viscosifying agent, such as a viscosifying polymer or viscoelastic fluid. In other embodiments, the carrier fluid is an oil-based fluid. In further embodiments, the oil-based fluid is a petroleum-based fluid or a gelled petroleum-based fluid, such as a mineral oil-based fluid or a gelled mineral oil-based fluid. In an example, the viscosity of the treatment fluid is from 20 to 10,000 cP at room temperature (the viscosity can depend on the fluid type).

In an embodiment, the treatment fluid comprises about 5 to 20 wt % of the first type of particle, about 5 to 20 wt % of the second type of particle, and about 60 to 90 wt % of a third type of particle. The second type of particle has a particle size less than or equal to about 0.6 mm. The third type of particle has a width from about 0.7 mm to 1.2 mm and a length from about 1.5 to 5 times the width. In some embodiments, the first and second degradable materials are the same; in other embodiments, the first and second degradable materials are different.

The method further includes forming a plug that includes particles of the first, second and third type of particle at the face of the formation. As used herein, a "plug" is a structure which restricts flow of fluid through the structure. The plugs described herein typically comprise degradable and ceramic particles which have been packed together. In some aspects the sealing ability of plugs formed by a combination of particles can be assessed through laboratory testing. An exemplary slot testing method is described below. In other aspects, an increase of at least 250 to 500 psi in pumping pressure is an indicator of seating of the particles within an existing fracture.

In an additional embodiment, a method for treatment of a wellbore in a fractured subterranean formation includes (i) introducing into the wellbore a treatment fluid comprising a carrier fluid, 0.0050 to 0.05 pounds/gallon of carrier fluid of a first type of particle, 0.0050 to 0.050 pounds/gallon of carrier fluid of a second type of particle, and 0.05 to 0.5 pounds/gallon of carrier fluid of a third type of particle; and (ii) forming a plug comprising particles of the first, second and third type of particle at the face of the formation. The first type of particle may have a particle size from about 2 mm to 3.5 mm and be formed of a first degradable material. The second type of particle may have a particle size less than or equal to about 0.6 mm and be formed of a second degradable material. The third type of particle may be elongated in shape, have a width from about 0.7 mm to 1.2 mm, a length from about 1.5 to 5 times the width, and be formed of a ceramic material. The first and second degradable material may optionally be the same.

In some embodiments, the concentration of the degradable particles in the treatment (carrier) fluid is from 0.005 to 0.1 pounds per gallon (5-100 pounds per 1000 gallons), 0.005 to 0.05 pounds per gallon (5-50 pounds per 1000 gallons) or 0.005 to 0.02 pounds per gallon (5-20 pounds per 1000 gallons). In further embodiments, the concentration of elongated ceramic particles in the treatment fluid is from 0.05 to 0.5 pounds/gallon, 0.05 to 0.25 pounds/gallon and 0.25 to 0.5 pounds/gallon. In additional embodiments, the concentration of the particle mixture is from 0.05-0.5 pounds/gallon or 0.1-0.5 pounds per gallon of carrier fluid. As an example, the particle mixture is mixed with the carrier fluid at the blender to place fluid with the desired particle loading to the wellhead. Additives can be included in the fluid on an as needed basis depending on well conditions and pump designs.

The effectiveness of a diversion composition can be evaluated using slot testing. One type of slot testing device includes a tapered slot with a variable slot width, which may also be termed the gap width, so as to create variation in the size of the slot along the length of the slot. FIG. 1 illustrates a piece 25 with a flat face (25a) and piece 26 with a machined channel with face 26a. In combination, pieces 25 and 26 form a slot; the slot formed between face 25a and face 26a has a slot width which decreases from the inlet end to the outlet end of the assembly.

Figure 2:
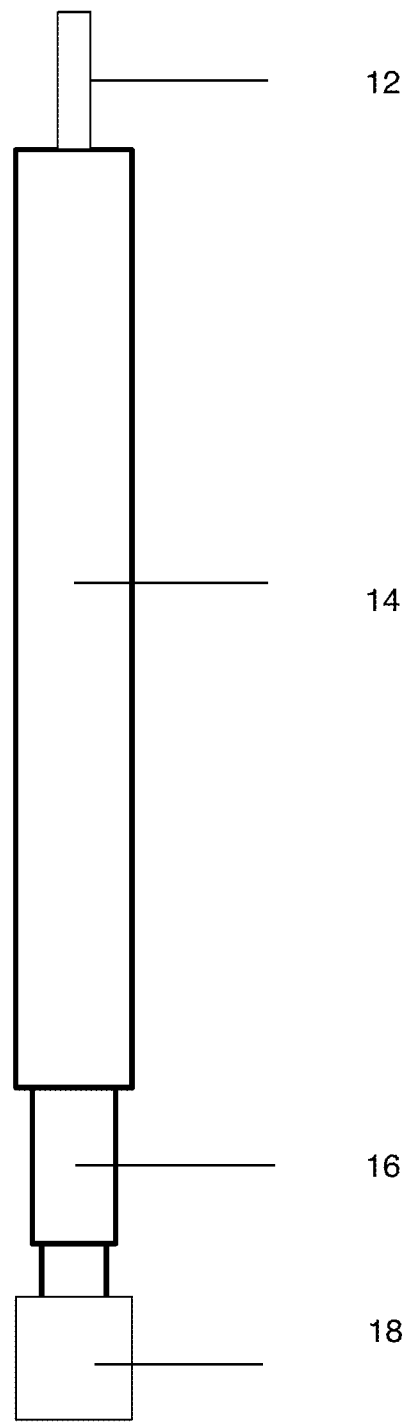
FIG. 2 schematically illustrates several elements of a slot testing device including a slurry holding cell (14) and slot holder (16). Gas line (12) and exhaust cap (18) are also shown.

FIG. 2 schematically illustrates additional elements of an exemplary slot testing device. The piece(s) forming the slot are placed within the illustrated slot holder (16). A slurry holding cell (14) holds a slurry of the treatment composition and a carrier fluid; the slurry holding cell is positioned upstream of the slot holder. A metal foil (not shown) is used to separate the slurry holding cell from the slot prior to the start of the test, which keeps the slurry from prematurely plugging the slot. A gas line (12) is used to apply pressure to the slurry. An exhaust cap (18) is disposed between the slot holder (16) and exhaust pipe (not shown). An optional heating jacket (not shown) may be placed around the slurry holding cell and the slot to maintain a desired temperature during the test During the test, application of gas pressure to the slurry provides a pressure differential across the metal foil. When the metal foil breaks, slurry is pushed into the slot. Bridge formation can be evaluated by observing whether flow of slurry and/or carrier fluid out of the slot was reduced and/or stopped under the applied pressure differential. After the test, the slot-forming pieces can be removed from the slot holder and then separated to see the total distance from slot exit to bridge. The approximate area covered with the bridge and backfill of particles can also be determined. When the diversion composition contains a combination of ceramic particles and meltable and/or dissolvable particles, melting or dissolving of these particles can allow assessment of the amount of ceramic particles contained in the backfill and/or bridge.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general, the terms and phrases used herein have their art-recognized meaning, which can be found by reference to standard texts, journal references and contexts known to those skilled in the art. The following definitions are provided to clarify their specific use in the context of the invention.

The invention may be further understood by the following non-limiting examples.

Example: Slot Testing of Particle Mixtures

A tapered slot device was built that was approximately 7.75" in length and machined to produce a variable slot width of 0.15" at the entrance port and 0.06" at the exit port. The other slot dimension is approximately 1.125".

A combination of two sizes of polylactic acid particles (3.5 mm-2.25 mm and 0.6 mm and smaller), and rod-shaped ceramic particles (Propynite®, Imerys, The Woodlands, Tex.) with diameter about 800 µm to about 1.1 mm and more than 75% of the lengths from about 1.0 mm to about 2.5 mm). The polylactic acid particles were provided in a concentration of between 0.01-0.05 pounds per gallon, with approximately equal weights of the two particle sizes. The ceramic particles were provided in a concentration from 0.05-0.5 pounds/gallon. To form the slurry, the particles were blended and suspended in a high viscosity fluid to ensure proper particle mixing and distribution.

Figure 3:
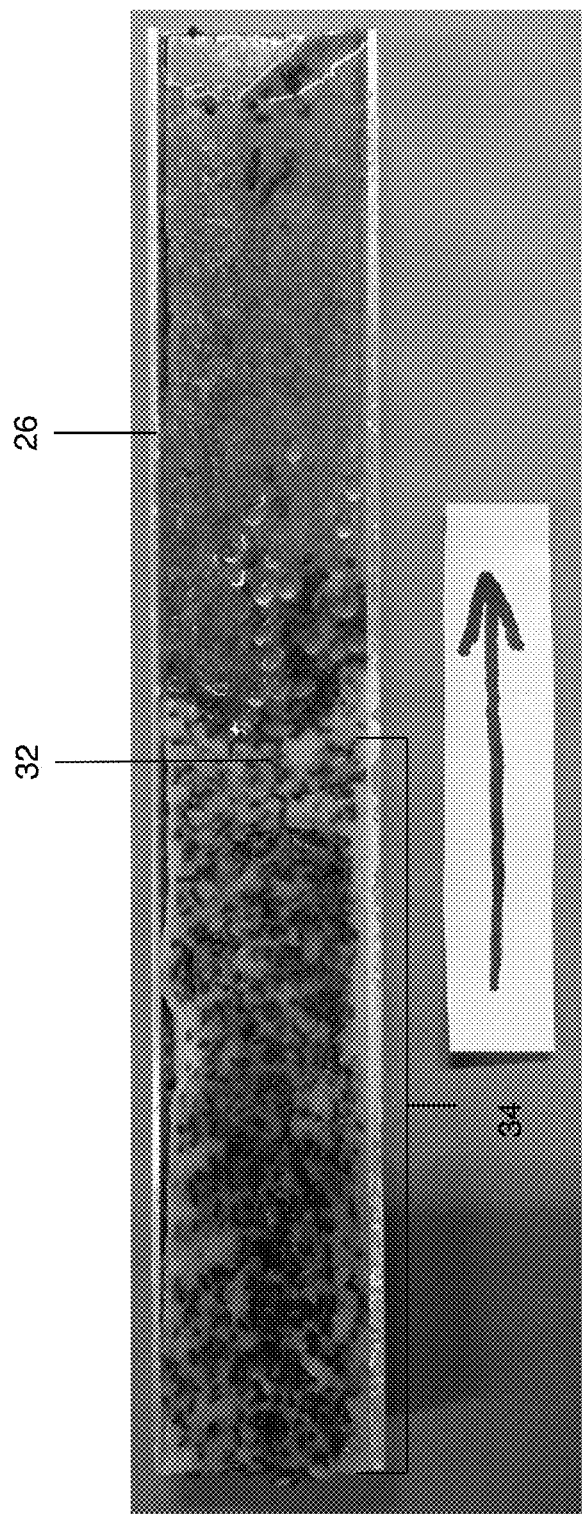
FIG. 3 illustrates a plug (34) of polylactic acid particles and rod shaped ceramic particles formed within the slot after testing. The approximate location of the bridge (32) is also shown. The arrow under part 26 indicates the direction of flow.

The slurry was flowed into the opening of the slot at a pressure differential of 500 psi. Bridge formation was evaluated by observing whether flow out the exit port was reduced and/or stopped under this pressure differential. The tapered slot device was then removed from the slot tester and opened to see the total distance from exit to bridge and determine the approximate area covered with the bridge and backfill of particles. FIG. 3 shows an image of one plug formed within the slot. The bridge occurred about 4" down the slot, which corresponds to a slot width of approximately 0.104". Once this was measured, the temperature was increased to dissolve the polylactic acid particles and the volume remaining of the ceramic particles was then measured and a representative concentration of ceramic particles was calculated. When expressed as weight per area of the slot, the concentration of ceramic particles was approximately 0.93 lb/ft$^2$.

For comparison, a slurry was prepared with the same size and concentration range of ceramic particles and same concentration range of polylactic acid particles, but the size of the degradable particles was 0.2-0.1 mm. The bridge occurred about 7" down the slot, which corresponds to a slot width of approximately 0.08". The proppant loading in the packed area was also approximately 1 lb/ft$^2$.

The invention claimed is:
1. A composition for plugging a wellbore, comprising:
   a. about 5 to 20 wt % of a first type of particle, the first type of particle having a particle size from 2.25 mm to 3.5 mm and comprising a first degradable polymeric material;
   b. about 5 to 20 wt % of a second type of particle, the second type of particle having a particle size less than or equal to 0.6 mm and comprising a second degradable polymeric material;
   c. about 60 to 90 wt % of a third type of particle, the third type of particle being elongated in shape, having a width from about 0.7 mm to 1.4 mm, having a length from about 1.5 to 5 times the width, and comprising a ceramic material comprising aluminum oxide;
   d. a fourth type of particle, wherein the fourth type of particle is a flake; and the flake has a width of about 0.10 in. to 0.5 in., a length of about 0.08 in. to about 0.2 in., and a thickness of about 0.01 in., to 0.02 in.; and
   e. a carrier fluid.
2. The composition of claim 1, wherein the particle size of the first type of particle is greater than 2.3 mm to less than 3.4 mm.
3. The composition of claim 1, wherein the particle size of the second type of particle is less than or equal to 0.5 mm.
4. The composition of claim 1, wherein the width of the third type of particle is from 0.8 mm to 1.1 mm.
5. The composition of claim 1, wherein the specific gravity of each of the first and second polymeric materials is from about 1.0 g/cc to 1.7 g/cc.
6. The composition of claim 1, wherein each of the first and second polymeric materials is selected from the group consisting of polylactic acid, polyglycolic acid, polyhydroxybutyrate, polyepsilon caprolactone, urea-based polymeric materials, and copolymers thereof.
7. The composition of claim 1, wherein the specific gravity of each of the first and second polymeric materials is from about 2.5 g/cc to 2.8 g/cc.
8. The composition of claim 1 wherein the specific gravity of the ceramic material is from 3.0 g/cc to 3.98 g/cc.
9. The composition of claim 1, wherein the ceramic material comprises at least 95% aluminum oxide.
10. The composition of claim 1, wherein the third type of particle is rod shaped.
11. The composition of claim 1, wherein at least 75% of the third type of particles have a length of about 1.0 mm to about 2.5 mm.
12. The composition of claim 1, wherein the carrier fluid is water-based or oil-based.
13. A composition for plugging a wellbore, comprising:
   a. about 5 to 20 wt % of a first degradable polymeric particle, the first degradable polymeric particle having a particle size from 2.5 mm to 3.5 mm;
   b. about 5 to 20 wt % of a second degradable polymeric particle, the second degradable polymeric particle having a particle size less than or equal to 0.6 mm;

c. about 60 to 90 wt % of a third particle, the third particle being elongated in shape, having a width from about 0.7 mm to 1.4 mm, having a length from about 1.5 to 5 times the width, and comprising a substantially non-degradable ceramic material;

d. a fourth particle, the fourth particle being a flake and having a width of about 0.10 in to 0.5 in, a length of about 0.08 in to about 0.2 in, and a thickness of about 0.01 in to 0.02 in.; and e. a carrier fluid.

14. The composition of claim 13, wherein each of the first and second degradable polymeric particle is selected from the group consisting of polylactic acid, polyglycolic acid, polyhydroxybutyrate, polyepsilon caprolactone, urea-based polymeric materials, and copolymers thereof.

15. The composition of claim 13, wherein the carrier fluid is water-based or oil-based.

16. The composition of claim 13, wherein the ceramic material is a metal oxide, a metal nitride, or a metal carbide.

17. A composition for plugging a wellbore, comprising:

a. about 5 to 20 wt % of a first type of particle, the first type of particle having a particle size from 2.5 mm to 3.5 mm and comprising a first polymeric degradable material;

b. about 5 to 20 wt % of a second type of particle, the second type of particle having a particle size less than or equal to 0.6 mm and comprising a second polymeric degradable material;

c. about 60 to 90 wt % of a third type of particle, the third type of particle being elongated in shape, having a width from about 0.7 mm to 1.4 mm, having a length from about 1.5 to 5 times the width, and comprising a ceramic material comprising a metal oxide, a metal nitride, or a metal carbide; and d. a carrier fluid.

18. The composition of claim 17, further comprising a fourth type of particle, the fourth type of particle being a flake.

\* \* \* \* \*